United States Patent Office 3,432,031
Patented Mar. 11, 1969

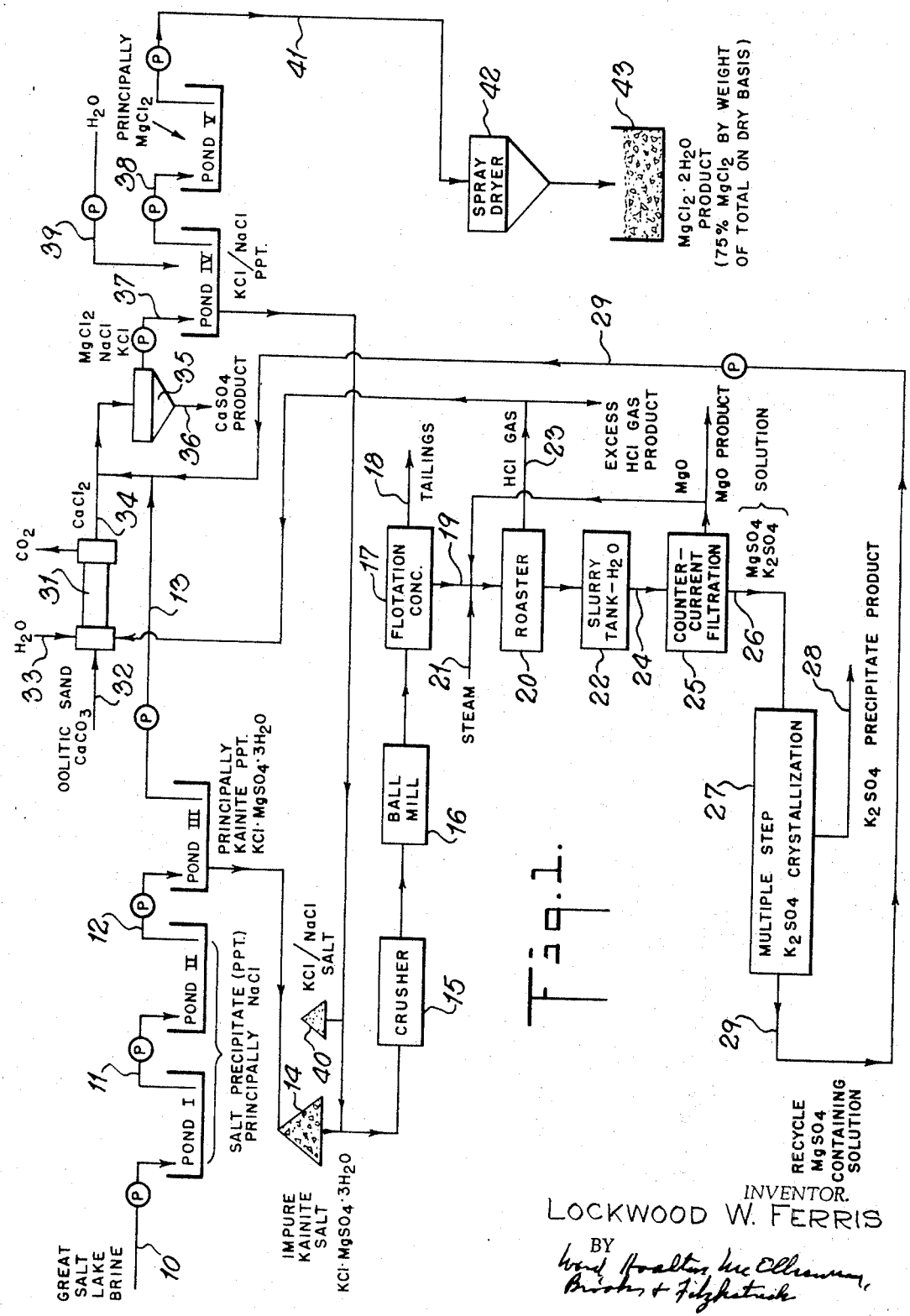

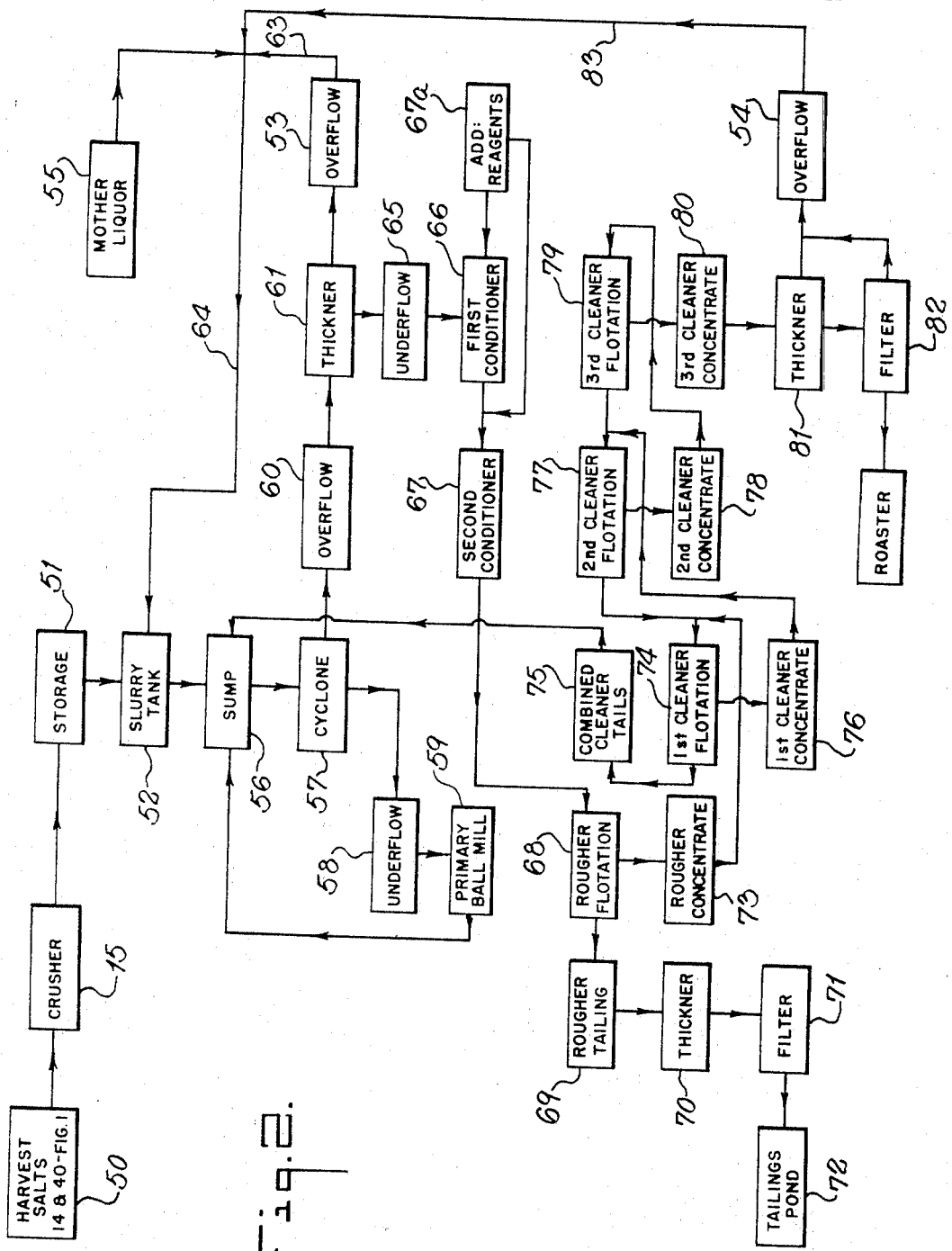

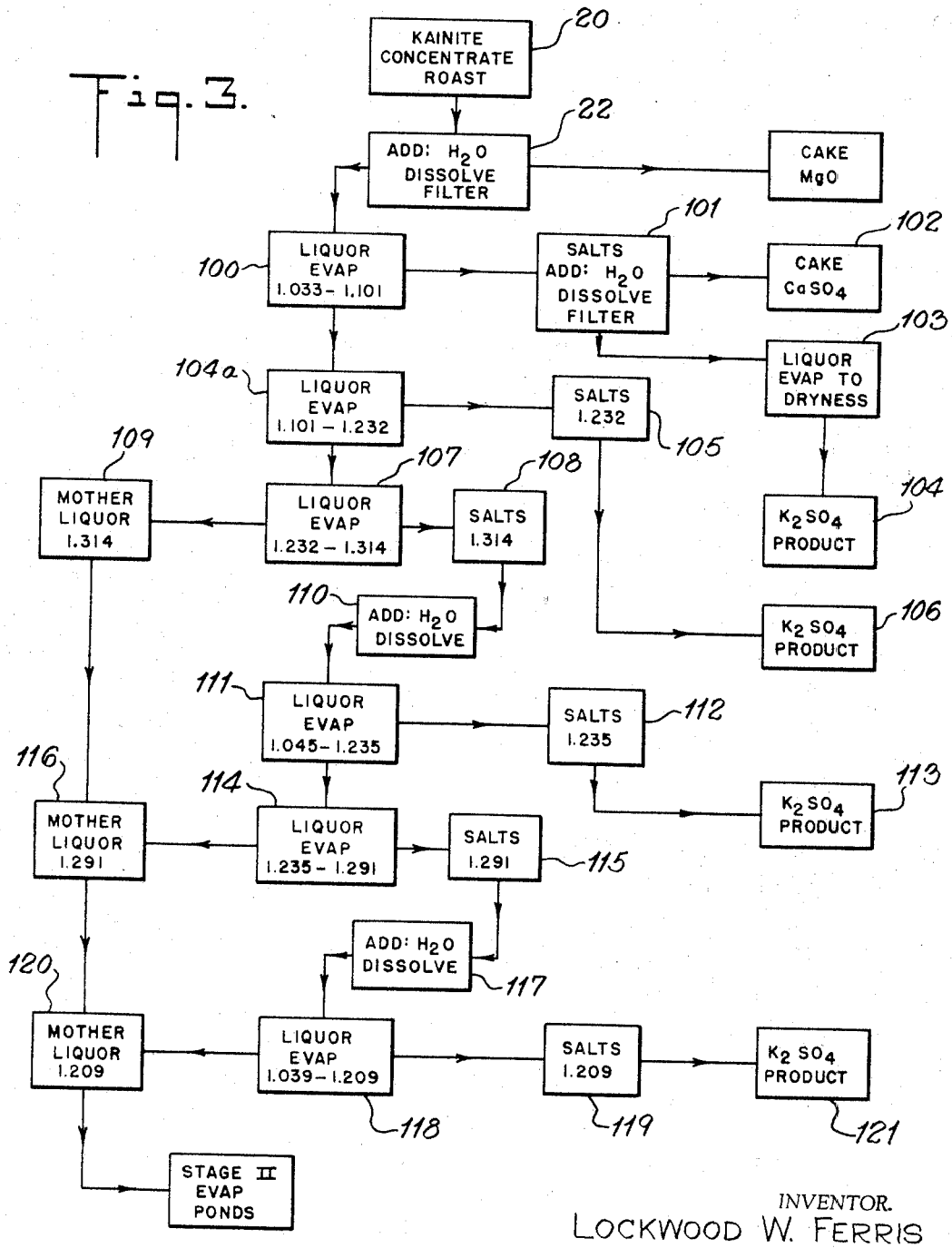

3,432,031
SELECTIVE RECOVERY OF SALTS FROM MIXED SALT SOLUTIONS
Lockwood W. Ferris, Salt Lake City, Utah, assignor, by mesne assignments, to National Lead Company, New York, N.Y., a corporation of New Jersey
Original application Oct. 2, 1964, Ser. No. 400,994. Divided and this application Aug. 22, 1967, Ser. No. 668,737
U.S. Cl. 209—10         8 Claims
Int. Cl. C01d 5/18, 5/10; B03d 1/08

ABSTRACT OF THE DISCLOSURE

Method of producing potassium sulfate from salts consisting essentially of potassium chloride and magnesium sulfate comprising; heating said salts in the presence of moisture at temperature sufficiently high, preferably at about 1250° F., to produce by interaction of said salts, a reaction product containing potassium sulfate and magnesium oxide, water slurrying the reaction product, separating the magnesium oxide and evaporating the resulting solution to precipitate potassium sulfate. The salts if initially in an impure state are purified by flotation concentration in the presence of a fatty amine acetate or chloride, prior to processing as above stated.

---

This application is a division of my co-pending application S.N. 400,994, filed Oct. 2, 1964.

This invention pertains to the selective recovery of salts from aqueous salt solutions containing a plurality of water-soluble salts, such as the chlorides and/or sulfates of sodium, potassium, magnesium, etc. The invention is more particularly concerned with the selective recovery of certain such salts from naturally occurring brines as found in the oceans, inland seas, salt lakes, well and the like, disposed about the earth's surface.

Such brines in general contain sodium chloride as the major constituent, together with lesser but nevertheless substantial amounts of the chlorides and/or sulfates of potassium and magnesium as the principal remaining salts.

Although such salts are important industrially as well as necessary to all forms of life, their isolation and recovery from naturally occurring brines is in many instances not the most economical way of obtaining the same as compared to other sources of supply, because involving in general problems of selective recovery of desired salts from the brine, and also in general the evaporation of the aqueous solvent in successive stages, which is quite expensive except where waste heat from industrial plants is available or where solar evaporation may be employed.

Where, however, solar evaporation is available throughout most of the year and where the concentration of salts in the naturally occurring brine source is high, it becomes commercially feasible to recover therefrom in accordance with my invention, such strategically important salts as potassium chloride or sulfate for use as fertilizer among other applications, and also magnesium chloride for use in the production of metallic magnesium by electrolysis, as well as other useful end products as discussed below.

Natural brines containing small amounts of potassium chloride can as a rule be evaporated to produce a mixed concentrate crystallization of potassium chloride and sodium chloride. However, if the brine contains more than a specific amount of sulfate and magnesium ions, it then becomes a problem of great intricacy to recover the potassium salts. A typical example of this is the brine of the Great Salt Lake in Utah, which contains relatively high amounts of sulfate and magnesium ions. As a result, if the original brine from the lake is evaporated under relatively warm conditions until a saturated solution of magnesium salts has been obtained, it will be found that all the potassium salts have been precipitated more or less completely, and that kainite $KCl \cdot MgSO_4 \cdot 3H_2O$ is the essential potassium-containing salt which is precipitated. This is a double salt wherein two salts, namely, potassium chloride and magnesium sulfate, are combined into one entity. The balance of the salts contained in the precipitate, are found to consist essentially of sodium chloride together with small amounts of magnesium and potassium salts. The mother liquor which is left over from the precipitation is primarily magnesium sulfate and magnesium chloride in the proportions roughly of about 30% of the sulfate and 60% of the chloride.

Having thus determined that kainite is the essential potassium-containing salt thus precipitated and that to further refine the same one must remove the above-mentioned contaminating salts admixed therewith, the problem arises as to how this may be accomplished. After extensive research, involving numerous attempts along diverse lines to solve this problem, I have discovered in accordance with one of the important aspects of my invention, that the refinement or purification of the kainite salt can be accomplished by flotation concentration employing a fatty amine acetate or chloride as the flotation agent. The amines which I found to be most effective for this purpose are the straight chain fatty amine acetates or chlorides containing essentially higher than eight carbon atoms. I have further discovered that although the secondary amines may be employed, they appear to be no more effective than the primary amines. I find that by the use of such collecting agents, the kainite salt may be readily floated into a high grade concentrate, while the remaining or contaminating salts admixed therewith are dropped during the flotation.

Having in this way obtained a purified double salt product containing only potassium chloride and magnesium sulfate, the next problem which arises is that of separating these two components and making the potassium salt available as such, since it is impossible to make an ordinary physical separation of the potassium chloride and magnesium sulfate values present in the double salt kainite. Again after extensive experimentation along various lines, I have discovered that this separation can be effected by roasting the kainite salt in the presence of moisture. I have found that this can be readily accomplished by roasting the kainite salt in the presence of steam at about 1250° F., as a result of which I have found that the chlorine switches to the magnesium while the potassium in turn switches to the sulfate radical, and that in turn the magnesium chloride thus formed decomposes into magnesium oxide and hydrochloric acid, with evolution of the latter from the roast. On leaching the roast product with water, there is thus obtained, a solution of potassium sulfate and magnesium sulfate together with the impurities in the concentrate, the magnesium oxide remaining as an insoluble residue after the roast product has thus been leached. The hydrochloric acid evolved during the roast is of course a useful end product which may be condensed and used as such in the first operation, i.e., to form the fatty acid amine chloride collecting agent, or for other purposes as set forth hereinafter.

The present invention has, therefore, as one of its primary objectives the provision of a commercially economical process for deriving potassium salts in high yield from naturally occurring brines containing the same along with sulfate and magnesium ions in substantial amounts.

The invention has as a further primary objective the provision of such a process for also obtaining magnesium chloride in high yield from such brines.

The invention has as a still further objective the provision of a fully integrated process for concurrently deriving both magnesium chloride and potassium sulfate in high yields from naturally occurring brines containing the chlorides and sulfates of sodium, potassium and magnesium, and wherein by-products produced in deriving one such end product are usefully employed in the recovery of the other, for enhancing the yield of each.

The double salt kainite contains only one-half the potassium chloride required to react with all of the magnesium sulfate present, so that the end product of the reaction still contains one unreacted mole of $MgSO_4$ per mole of $K_2SO_4$ produced, the reaction being as follows, on roasting the kainite as aforesaid:

(1) $\qquad 2KCl \cdot MgSO_4 \cdot 3H_2O + H_2O$

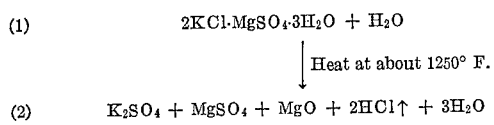

(2) $\qquad K_2SO_4 + MgSO_4 + MgO + 2HCl\uparrow + 3H_2O$

In order to increase the yield of the potassium sulfate thus formed, the invention involves as a further feature thereof, the crystallization from the brine at one stage thereof, of the salt carnallite $KCl \cdot MgCl_2 \cdot 6H_2O$. This salt upon addition thereto of a limited amount of water, i.e., to the extent of about one-half the weight of the salt, decomposes the same into magnesium chloride, which goes into solution, and potassium chloride which remains as an impure precipitate, contaminated in general by other salts, principally sodium chloride. The impure potassium chloride salt precipitate may be admixed with the impure kainite, and the mixture subjected to purification as above described to produce a purified admixture of kainite and potassium chloride. Alternatively the impure potassium chloride salt and the impure kainite salt may be separately purified by flotation concentration and the purified salts then admixed. If sufficient potassium chloride is thus added to the kainite to provide complete reaction with all of the magnesium sulfate present in the kainite salt, the following reactions occur on roasting the purified salt admixture at about 1250° F.:

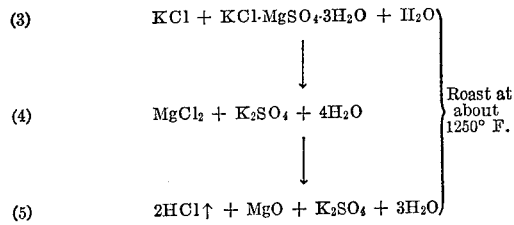

(3) $\qquad KCl + KCl \cdot MgSO_4 \cdot 3H_2O + H_2O$ (4) $\qquad MgCl_2 + K_2SO_4 + 4H_2O$ — Roast at about 1250° F.

(5) $\qquad 2HCl\uparrow + MgO + K_2SO_4 + 3H_2O$

This modified procedure of Equations 3–5 incl., has decided advantage as compared to that of Equations 1 and 2, in which latter there is retained in solution both the potassium and magnesium sulfate salts which must be separated in the manner hereinafter described for isolation and recovery of the potassium salt.

Many naturally occurring brines do not, however, contain sufficient potassium chloride to react with all of the magnesium sulfate contained in the kainite salt obtained from the brine. In addition the mother liquor from which the kainite salt is precipitated in general contains substantial amounts of magnesium sulfate. In accordance with a further feature of the invention, all of the magnesium sulfate retained in solution may be converted into the desired end product magnesium chloride, by reacting a cheap source of calcium carbonate, such for example as oolitic sand, with the HCl gas evolved from reactions (2) or (5) supra, to produce calcium chloride with which the brine fraction containing the unreacted magnesium sulfate is treated for conversion to magnesium chloride, thereby to increase the yield of the latter. This series of reactions is as follows:

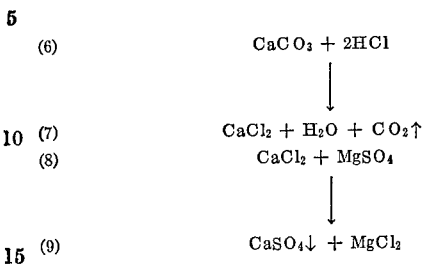

(6) $\qquad CaCO_3 + 2HCl$ (7) $\qquad CaCl_2 + H_2O + CO_2\uparrow$ (8) $\qquad CaCl_2 + MgSO_4$ (9) $\qquad CaSO_4\downarrow + MgCl_2$ As shown by Equation 9, the calcium sulfate formed by treating the $MgSO_4$ containing brine fraction with $CaCl_2$, precipitates from the solution and may thus be separated by filtration or otherwise.

Having thus described various outstanding features of the invention, the overall process will be briefly outlined as preliminary to a detailed discussion of a preferred embodiment with reference to the accompanying drawings.

A naturally occurring brine, such as sea water, lake brine or the like, for example brine from the Great Salt Lake in Utah, U.S.A., is first concentrated by evaporation, preferably by solar evaporation, until the sodium chloride is selectively crystallized out, i.e., without appreciable crystallization of the remaining salts. I have found that by employing several successive stages of such concentration and crystallization, all but a few percent of the sodium chloride may be precipitated without appreciable entrainment of the mother liquor or loss of the remaining salts. Thus I find that if the initial brine to be processed, is subjected to a first stage of evaporation until about 50–70% by weight of the total salts present have precipitated, and the solution or mother liquor drawn off and subjected to a second stage of evaporation until about one-half by weight of the remaining salts have been precipitated and the solution or mother liquor drawn off, that most of the sodium chloride originally present may thus be precipitated and separated from the mother liquor which thereby becomes highly enriched with the remaining more soluble salts present, consisting principally of the chlorides and sulfates of potassium and magnesium.

I find that if this mother liquor as thus drawn off from the second stage of evaporation, is further concentrated by evaporation in a third stage until salt precipitation occurs, that depending on the temperature at which precipitation occurs the predominent constituent of the precipitate may be either the double salt kainite, $KCl \cdot MgSO_4 \cdot 3H_2O$, or the double salt picromerite, $K_2SO_4 \cdot MgSO_4 \cdot 6H_2O$, admixed with other salts such as $MgCl_2$, $KCl$, etc. The picromerite precipitates at lower temperature than does the kainite, but can be converted to the kainite salt by washing the picromerite containing salt admixture with water at about 25° C. or higher, whereupon the kainite salt is precipitated. In any event, the kainite as thus obtained is in an impure state, contaminated principally by the sodium chloride retained in solution until this stage. At this stage there remains in solution in the mother liquor principally magnesium chloride and magnesium sulfate together with lesser amounts of potassium chloride and sodium chloride.

When precipitation of the kainite (or alternatively the picromerite) salt has proceeded to substantial completion, the mother liquor is withdrawn from the third evaporation stage and the impure salt is then harvested and may be processed as above described with reference to Equations 1 and 2, supra. Preferably, however, it is retained in bulk form for processing in accordance with Equations 3–5, incl., and this is accomplished in the following manner.

The mother liquor withdrawn from the third stage of evaporation consists principally of a solution of magnesium chloride and magnesium sulfate together with lesser amounts of potassium chloride and sodium chloride. This solution is now treated at this stage with calcium chloride obtained as above described with reference to Equations 6–9, incl., in order to convert the magnesium sulfate into magnesium chloride, thereby to supplement the magnesium chloride originally present as such in the so-treated brine. The calcium sulfate precipitate is removed by filtration or otherwise.

The resulting solution contains in addition to the magnesium chloride thus formed and that originally present, substantial amounts of retained sodium and potassium chlorides. For removal of the KCl and NaCl values this solution is subjected to a fourth stage of evaporation whereupon the mixed salt carnallite, $KCl \cdot MgCl_2 \cdot 6H_2O$, crystallizes out along with additional NaCl. At this stage the mother liquor containing principally $MgCl_2$ in solution is drawn off and fed to a storage reservoir, and to the retained salt precipitate is added an amount of water equal to about one-half the weight of the salt. The magnesium chloride present in the carnallite thus goes into solution leaving the potassium and sodium chlorides in precipitated form. The magnesium chloride containing solution is drawn off and fed to the storage pond for admixture with that fed thereto as above described.

In order to increase the yield of potassium sulfate, the KCl/NaCl precipitate from the fourth evaporation stage may, in accordance with a further processing of the invention, be admixed with the impure kainite precipitate obtained from the third stage of evaporation and the mixture purified in the manner above described by flotation and thereupon roasted to convert all or a major portion of the magnesium sulfate present in the kainite, into potassium sulfate in accordance with the reactions of Equations 3–5, incl., supra. If the original brine contains a sufficiently high fraction of potassium chloride all of the magnesium sulfate will thus be converted into potassium sulfate. But in any event the potassium sulfate fraction will be increased above that of Equation 2 in proportion to the amount of potassium chloride present in the original brine.

The magnesium chloride enriched solution fed to the storage pond as above described, is subjected to additional evaporation of water therein, thereby increasing the magnesium chloride concentration of the brine to about 25–40% by weight of the total. This concentrated brine may now be converted to a dry bulk state by spray-drying or otherwise to provide a free-flowing crystalline end product assaying about 75% by weight on a dry basis of magnesium chloride which solidifies out as $MgCl_2$ containing about 1½ to 2 moles of combined water.

Reference will now be had for a more detailed description of the above and other features of the invention, to the accompanying drawings wherein:

FIG. 1 comprises a flow sheet of the sequence of operations of the overall process of my invention in accordance with a preferred embodiment thereof;

FIG. 2 is a flow sheet of the flotation concentration of the impure kainite or admixture of the impure kainite and impure potassium containing salts as above mentioned; and FIG. 3 is a flow sheet of the water extraction and crystallization of the $K_2SO_4$ of the roast product above described with reference to Equations 1–5, incl.

The invention will be described with reference to the drawings, to the processing of brine from the Great Salt Lake in Utah, U.S.A. The brine is pumped directly from the lake over a pipeline 10 referring to the flow sheet of FIG. 1, and fed into an enclosed solar evaporating Pond I. The following Table I is an assay of the lake brine as thus introduced.

TABLE I

Stage I feed=100% of total:
   Great Salt Lake brine=5,654.0M tons
   Specific gravity=1.190 at 30° C.
   Percent salinity=25.24

| Salts | Assay | Weight, tons×1,000 | Percent weight |
|---|---|---|---|
| Na₂SO₄ | .50 | 7.1 | 100.00 |
| MgSO₄ | 8.01 | 114.3 | 100.00 |
| MgCl₂ | 5.61 | 80.1 | 100.00 |
| KCl | 3.25 | 46.4 | 100.00 |
| NaCl | 82.63 | 1,179.2 | 100.00 |
| Salts | 100.00 | 1,427.1 | 100.00 |
| H₂O | | 4,226.9 | |
| Total | 100.00 | 5,654.0 | |

In Pond I the brine is subjected to solar evaporation until the specific gravity of the solution has increased from the original value of 1.190 as given in Table I to 1.245 at 30° C. at which stage the evaporation of water and precipitation of salts in Pond I, had occurred as shown in the following Table II:

TABLE II

Evaporation:
   74.02% loss H₂O
   3,128.9M tons=55.34% of total
   Stage I salts precipitated.

| Salts | Assay | Weight, tons×1,000 | Percent weight |
|---|---|---|---|
| Na₂SO₄ | .38 | 3.3 | 46.60 |
| MgSO₄ | 1.70 | 14.8 | 12.91 |
| MgCl₂ | .59 | 5.1 | 6.40 |
| KCl | .10 | .9 | 1.87 |
| NaCl | 97.23 | 844.3 | 71.60 |
| Salts | 100.00 | 868.4 | 60.85 |

At this stage the mother liquor or solution in Pond I was drawn off over a conduit 11, referring to the flow sheet and fed into a second evaporating Pond II. This solution had the composition given in the following Table III:

TABLE III

Stage II Feed=29.30% of total:
   Liquor from stage I pond=1,656.6M tons
   Specific gravity=1.245 at 30° C.
   Percent salinity=33.72

| Salts | Assay | Weight, tons×1,000 | Percent weight |
|---|---|---|---|
| Na₂SO₄ | .68 | 3.8 | 53.40 |
| MgSO₄ | 17.82 | 99.5 | 87.09 |
| MgCl₂ | 13.42 | 75.0 | 93.60 |
| KCl | 8.15 | 45.5 | 98.13 |
| NaCl | 59.93 | 334.8 | 28.40 |
| Salts | 100.00 | 558.6 | 39.15 |
| H₂O | | 1098.0 | |
| Total | 100.00 | 1656.6 | |

In Pond II the brine was subjected to solar evaporation until its specific gravity had increased to 1.305 at 30° C. At this stage further evaporation had occurred and salts had precipitated as shown in the following Table IV:

TABLE IV

Evaporation:
   11.96% Loss H₂O
   505.4M tons=8.94% of total
Stage II salts precipitated: 244.9M tons=4.33% of total

| Salts | Assay | Weight, tons×1,000 | Percent weight |
|---|---|---|---|
| Na₂SO₄ | 1.59 | 3.8 | 53.40 |
| MgSO₄ | .62 | 1.5 | 1.32 |
| MgCl₂ | 2.76 | 6.8 | 8.43 |
| KCl | 1.16 | 2.8 | 6.12 |
| NaCl | 93.92 | 230.0 | 19.50 |
| Salts | 100.00 | 244.9 | 17.16 |

The solution or mother liquor in Pond II was then withdrawn over conduit 12 of the flow sheet into a third Pond III, at which stage its analysis was as given in Table V below:

TABLE V

Stage III=16.03% of total:
Liquor from stage II pond=906.4M tons
Specific gravity=1.305 at 30° C.
Percent salinity=34.62

| Salts | Assay | Weight, tons×1,000 | Percent weight |
|---|---|---|---|
| $MgSO_4$ | 31.22 | 98.0 | 85.77 |
| $MgCl_2$ | 21.84 | 68.5 | 85.17 |
| KCl | 13.60 | 42.7 | 92.01 |
| NaCl | 33.34 | 104.6 | 8.90 |
| Salts | 100.00 | 313.8 | 21.99 |
| $H_2O$ | | | 592.6 |
| Total | 100.00 | 906.4 | |

It will be observed from Tables I–V, incl., that at this stage of operations, all but a few percent of the NaCl salt present in the entering lake brine had been selectively crystallized out in Ponds I and II, leaving in the mother liquor fed into Pond III only 104.6 tons of NaCl as compared to 1179.2 tons thereof present in the original Salt Lake brine. It will be further noted from Tables II and IV, that the heavy crystallization of NaCl in Ponds 1 and II was accompanied by crystallization of only relatively minor amounts of the other salts contained in the entering lake brine. Hence the crystallization occurring in Ponds I and II selectively removed most of the NaCl without materially removing the remaining salts.

Reverting to the flow sheet, the mother liquor in Pond III was subjected to solar evaporation until its specific gravity had risen to 1.312 at 30° C., at which stage further evaporation had occurred and salts had crystallized out as shown in Table VI below:

TABLE VI

Evaporation:
9.96% loss $H_2O$
420.8M tons=7.44% of total
Harvest salts precipitated: 232.9M tons=4.12% of total

| Salts | Assay | Weight, tons×1,000 | Percent weight |
|---|---|---|---|
| $MgSO_4$ | 35.72 | 83.2 | 72.77 |
| $MgCl_2$ | 6.15 | 14.3 | 17.88 |
| KCl | 15.28 | 35.6 | 76.76 |
| NaCl | 42.85 | 99.8 | 8.46 |
| Salts | 100.00 | 232.9 | 16.32 |

At this stage the solution or mother liquor in Pond III was withdrawn over conduit 13 of the flow sheet for further processing as hereinafter explained and was found to be of the analysis given in Table VII below:

TABLE VII

Mother liquor=4.47% of total:
Liquor from harvest pond=252.8M tons
Specific gravity=1.312 at 30° C.
Percent salinity=32.03

| Salt | Assay | Weight, tons×1,000 | Percent weight |
|---|---|---|---|
| $MgSO_4$ | 18.36 | 14.9 | 13.00 |
| $MgCl_2$ | 66.62 | 53.9 | 67.29 |
| KCl | 8.74 | 7.1 | 15.25 |
| NaCl | 6.28 | 5.1 | .44 |
| Salts | 100.00 | 81.0 | 5.67 |
| $H_2O$ | | 171.7 | |
| Total | 100.00 | 252.7 | |

It will be noted from Table VI that at this stage, the salts precipitated in Pond III consisted predominantly of $MgSO_4$, $MgCl_2$ and KCl, the balance being NaCl. As against this, the mother liquor withdrawn from Pond III consisted as shown in Table VII, predominantly of $MgSO_4$ and $MgCl_2$ together with relatively small amounts of NaCl and KCl.

The crystal salt bed remaining in Pond III after withdrawal of the mother liquor, was harvested and found to consist principally of the mixed salt kainite $$KCl \cdot MgSO_4 \cdot 3H_2O$$

in an impure state, being contaminated by admixture with other salts, consisting principally of NaCl.

In accordance with one processing technique according to the invention the impure kainite product as thus harvested from Pond III and as shown accumulated in bulk at 14 of the flow sheet, was fragmented in a crusher 15, thence comminuted in a ball mill 16, and thence purified by flotation concentration in a flotation cell 17. The waste tailings were eliminated, as at 18, and the purified kainite with steam introduced at 21. In the roaster the kainite and steam interact as set forth in Equations 1 and 2 supra, to produce $K_2SO_4$ which is thrown into solution with the unreacted $MgSO_4$, in a water slurry tank 22 into which the reaction mass from the roaster is discharged. The MgO of the reaction product remains in solid state. The HCl gas evolved in the reaction is conducted away over a pipeline 23.

The slurry from slurry tank 22 is fed over a conduit 24 into a countercurrent filtration unit 25, for filtering off the MgO precipitate, while the aqueous solution of $MgSO_4$ and $K_2SO_4$ is fed over a conduit 26 into a multiple step crystallization unit 27, for fractional precipitation of the purified $K_2SO_4$ salt, which is removed as at 28, for drying and subsequent storage. The fractional precipitation is conducted in unit 27 until the $K_2SO_4$ remaining in the mother liquor is reduced to about 5%, so that this liquor which is drawn off over a conduit 29, and recycled as explained below, consists principally of $MgSO_4$ salt in solution.

For converting into $MgCl_2$, the magnesium sulfate contained in the mother liquor withdrawn from Pond III over conduit 13, and also that recycled over conduit 29, a portion of the HCl gas from the roaster 20 is fed over conduit 23, to a reactor 31, into which is fed a cheap source of $CaCO_3$, such as oolitic sand, as at 32, and water, as at 33, whereby the $CaCO_3$ is converted to $CaCl_2$ in accordance with the reactions of Equations 6 and 7, supra. The calcium chloride solution thus formed is delivered from the reactor over conduit 34 and mixed with mother liquor from the transporting conduits 13 and 29, and discharged into thickener 35. The $CaCl_2$ reacts with the $MgSO_4$ in the mother liquor to form $MgCl_2$ with precipitation of $CaSO_4$, which is separated in the thickener 35 and discharged over conduit 36, while the solution is drawn off over a conduit 37 which discharges into a Pond IV.

The liquor charged into Pond IV had the analysis given in Table VIII below:

TABLE VIII.—POND IV FEED—DATA ON SALTS

| Salts | Assay | Weight, tons×1,000 | Percent weight |
|---|---|---|---|
| $MgSO_4$ | 8.68 | 6.88 | 6.02 |
| $MgCl_2$ | 75.93 | 60.20 | 75.16 |
| KCl | 8.96 | 7.10 | 15.25 |
| NaCl | 6.43 | 5.10 | .44 |
| Salts | 100.00 | 79.28 | 5.56 |

This liquor was subjected to evaporation in Pond IV until salt had precipitated which assayed as shown in Table IX below:

TABLE IX.—PHASE IV SALTS PRECIPITATED

| Salts | Assay | Weight, tons×1,000 | Percent weight |
|---|---|---|---|
| $MgSO_4$ | 5.49 | .46 | .40 |
| $MgCl_2$ | 26.13 | 2.19 | 2.74 |
| KCl | 63.25 | 5.30 | 11.43 |
| NaCl | 5.13 | .43 | .04 |
| Salts | 100.00 | 8.38 | .60 |

Upon withdrawal of the mother liquor over conduit 38 from Pond IV and discharge thereof into Pond V, referring to the flow sheet, the salt bed remaining in Pond IV was found to consist principally of the mixed salt carnallite $KCl \cdot MgCl_2 \cdot 6H_2O$ and NaCl. To this salt bed was added over pipeline 39, an amount of water equal to about one-half the weight of the salt. This dissolved the $MgCl_2$ from the carnallite, leaving NaCl and KCl in precipitated form. The solution containing the $MgCl_2$ was withdrawn over pipeline 38 into the storage Pond V, and the salt bed remaining in Pond IV was harvested and found to assay as in the following Table X:

TABLE X.—KCl FLOTATION FEED

| Salts | Assay | Weight, tons×1,000 | Percent weight |
|---|---|---|---|
| MgSO₄ | 7.06 | .46 | .40 |
| MgCl₂ | 5.06 | .33 | .41 |
| KCl | 81.28 | 5.30 | 11.43 |
| NaCl | 6.60 | .43 | .04 |
| Salts | 100.00 | 6.52 | .46 |

This salt consisting principally of KCl, was accumulated in bulk, as at 40 of the flow sheet, and admixed with the impure kainite 14, and the resulting mixture was crushed, ground and purified, as at 15, 16, 17, and roasted, as at 20, to react the mass as in Equations 3–5, incl., supra, the subsequent processing being as described for recovering $K_2SO_4$ as an end product.

The resulting solution delivered to Pond V was found to assay as to salt content as shown in the following Table XI:

TABLE XI.—PHASE V FEED—DATA ON SALTS

| Salts | Assay | Weight, tons ×1,000 | Percent weight |
|---|---|---|---|
| MgSO₄ | 8.82 | 6.42 | 5.67 |
| MgCl₂ | 82.29 | 59.87 | 4.75 |
| KCl | 2.47 | 1.80 | 3.88 |
| NaCl | 6.42 | 4.67 | .40 |
| Salts | 100.00 | 72.76 | 5.10 |

The $MgCl_2$ in solution in Pond V was allowed to concentrate by solar evaporation until the $MgCl_2$ concentration was increased to about 25–40% by weight of the total solution. It was then withdrawn from this pond over a conduit 41, and delivered to a spray or other suitable type of drier 42, for providing a free-flowing bulk $MgCl_2$ salt containing about ½ to 2 moles of combined water, and assaying about 75% of $MgCl_2$ by weight of the total on a dry basis, which product was discharged into a storage bin 43.

The following describes a process according to the invention for the concentration by flotation of kainite, $KCl \cdot MgSO_4 \cdot 3H_2O$, and sylvite (KCl) from the contaminating salts of the mixture of impure salts 14 and 40 of the FIG. 1 flow sheet, which mixture is shown at 50 of the FIG. 2 concentration flotation sheet. Referring thereto, this harvest salt admixture 50 is taken to crusher 15 and thence to storage 51. A feeder from storage 51 conveys the material to slurry tank 52, where it is mixed with overflows 53 and 54. These overflows consist of a brine which has been adjusted to the soluble components of the harvest salts 50 and thus can be said to be in equilibrium with both the kainite and sylvite, as well as the other soluble minerals, which are principally kalite (NaCl) and bischoffite ($MgCl_2 \cdot 6H_2O$) contained in the harvest salts 50. Mother liquor 55 withdrawn from Pond III, FIG. 1, and of the analysis shown in Table VII, supra, is the original make up brine.

The slurry from slurry tank 52 is pumped from sump 56 through cyclone 57, the underflow 58 from which consists of material larger than that which would pass a 100 mesh per inch screen, is taken to ball mill 59 for grinding. The ground material is returned to sump 56 and is again taken through cyclone 57. The ball mill is therefore in closed circuit with the cyclone.

Overflow 60 from cyclone 57, is taken to thickener 61, and the clear overflow 53, as required, is taken to slurry tank 52 via 63, 64. Underflow 65 from thickener 61, adjusted to approximately 40% solids is taken to first conditioner 66 and second conditioner 67. Add reagents 67a are fed to first and second conditioners 66 and 67 as follows:

To first conditioner 66 is fed approximately 0.40 lbs. per ton of feed of a water soluble acetate or chloride salt of an unsaturated fatty acid primary amine containing about 90–97% by weight of primary amine and having a molecular weight in the range of about 220–290. Such salts are of the cationic type. In general, the distilled primary amine acetates, of coconut or tallow fatty acids are the more desirable. These include those sold by Armour & Company under the trade name of "Armac C," "CD," "T" or "TD," and by the ADM Company under the trade name "Adogen 160," "160–D," "170" or "170–D." A stoichiometric quantity of acetic acid or HCl with approximately 5% additional, is mixed with these reagents to render them water soluble. The reagents fed to first conditioner 66 are commonly called promoting or collecting reagents.

To second conditioner 67 is fed about 0.01 lb. per ton of feed, or any of the higher aliphatic alcohols which are liquid at normal temperatures, such as 1-, 2- or 3- pentasol or mixtures thereof. Also, American Cyanamid Company's Aerofroth 73 or 77 may be used. The reagents fed to conditioner 67 are commonly called "frothers."

Retension time of the pulp in contact with the reagents through conditioners 66 and 67 is important. Minimum retention or contact time through the two conditioners is twelve minutes for the amine collector. Retention or contact time for the frother (fed to 67) is a minimum of one minute.

The now reagentized pulp is taken to rougher flotation unit 68. The rougher flotation equipment consists of a typical sub-aereated, gravity flow commercial flotation machine, such as that sold by the Denver Equipment Company. The sole difference in the present process as compared to conventional practice is that the speed of rotation is reduced from 25% to 35% from that which is considered normal speed in other flotation practices. The speed is reduced to provide gentler agitation. The flotation cells are arranged so that the pulp will have a total residence time, within the cells, of a minimum of twelve minutes. The rougher tailings 69 are taken to thickener 70, thence to filter 71, and discharged thence into tailings pond 72. Overflows (not shown) from the thickener and filter may be reused or discarded.

The rougher concentrate 73 is taken to first cleaner flotation 74. First cleaner flotation is accomplished in cells similarly constructed and operated as those in the rougher floation. Residence time in first cleaner flotation is not more than 2.5 minutes. First cleaner 74 tails are taken to combined cleaner tails 75.

First cleaner concentrate 76 is taken to second cleaner flotation 77. The second cleaner cells in most respects are similar to first cleaner 74. The tailings from this cleaning section are passed counter-currently through the first cleaner cells to combined cleaner tails 75. Residence time maximum is 2.5 minutes.

Second cleaner concentrate 78 is taken to third cleaner flotation 79. The third cleaner cells in most respects are similar to those of first cleaner 74 and second cleaner 77. The tailings from this cleaning section are passed counter-currently through the second cleaner and first cleaner sections to combined cleaner tails 75. Residence time maximum is 2.5 minutes.

Third cleaner concentrate 80 is taken to thickener 81 and filter 82. The overflow 54 (as required) is returned to slurry tank 52 via 83, 64. The filtrate from filter 82 is taken to the roaster 20 for processing as above described with reference to FIG. 1. Combined cleaner tails 75 are returned to sump 56 via 84 for reclassifying. The final concentrate, that is to say, third cleaner concentrate 80, is that containing about 90% of the KCl that was present in the original feed.

Referring to the flow sheet of FIG. 3, the roast product from the roaster 20, is slurried with water in the slurry tank 22, and thence filtered as above described with reference to FIG. 1 in the countercurrent filter 25 thereof. The filtrate having an initial specific gravity of about 1.033 is evaporated until the specific gravity is increased to about 1.101, as indicated at 100, FIG. 3. The precipitated salts are separated from the mother liquor as indicated at 101, then slurried with enough water to dissolve all soluble salts, and then filtered and washed. Any $CaSO_4$ present is filtered off as indicated at 102. The filtrate is evaporated to dryness as shown at 103 to provide a dry product consisting predominantly of $K_2SO_4$ as shown at 104. This step is employed only when the filtrate from 22 contains the mineral Syngenite, $K_2Ca(SO_4)_2 \cdot 2H_2O$ which is water soluble. The $CaSO_4$ fraction is precipitated in step 100.

The mother liquor from step 100 is further evaporated from the specific gravity of 1.101 to 1.232 as indicated at 104. The precipitated salts are separated from the mother liquor as shown at 105 and dried to give a dry product consisting principally of $K_2SO_4$ as shown at 106. The mother liquor from step 104 is further evaporated from a specific gravity of 1.232 to 1.314, as shown at 107. The precipitated salts 108 are separated from the mother liquor 109, and are completely dissolved in water as at 110, and the resulting solution evaporated from an initial specific gravity of 1.045 to 1.235 as shown at 111. The precipitated salts are separated from the mother liquor as indicated at 112 and dried to provide a dry product 113 consisting principally of $K_2SO_4$. The mother liquor from step 111 is further evaporated from a specific gravity of 1.232 to 1.291 as shown at 114, and the precipitated salts 115 separated from the mother liquor 116. The salts 115 are completely dissolved in water as indicated at 117, and the mother liquor evaporated from a specific gravity of 1.039 to 1.209 as indicated at 118. The precipitated salts 119 are separated from the mother liquor 120, and the salts dried to provide a dry product 121 consisting principally of $K_2SO_4$. The mother liquors 109, 116 and 120 are combined and returned to the evaporating Pond II of FIGS. 1 and 3. The total $K_2SO_4$ product from steps 104, 106, 113 and 121 comprised about 90% of the $K_2SO_4$ values contained in the roast product 20. The yield could of course be further increased to any desired extent by further steps as above described. In the above described sequence of steps about 62.9% of the total $K_2SO_4$ from the roast product was obtained in steps 104 and 106.

What is claimed is:

1. The method of producing potassium sulfate from salts consisting essentially of potassium chloride and magnesium sulfate, which comprises: heating said salts in the presence of moisture at temperature sufficiently high to produce by interaction thereof, a reaction product containing potassium sulfate and magnesium oxide with evolution of HCl gas, slurrying the reaction product in water, separating the magnesium oxide, and evaporating the resulting solution to precipitate potassium sulfate.

2. The method of producing potassium sulfate from potassium chloride and magnesium sulfate double salts, which comprises: heating said salts at about 1250° F. in the presence of steam to form a reaction product containing potassium sulfate, magnesium sulfate and magnesium oxide with evolution of HCl gas, slurrying the reaction product in water, separating the magnesium oxide precipitate, and evaporating the resulting solution to precipitate potassium sulfate.

3. The method of producing potassium sulfate from a mixture of potassium chloride and potassium chloride and magnesium sulfate double salts, said mixture containing at least two moles of potassium chloride per mole of magnesium sulfate, which comprises: heating said salts at about 1250° F. in the presence of steam to form a reaction product consisting of potassium sulfate and magnesium oxide with evolution of HCl gas, slurrying the reaction product with water, removing the magnesium oxide precipitate, and evaporating the resulting solution to precipitate potassium sulfate.

4. The method of producing $K_2SO_4$ from kainite $KCl \cdot MgSO_4 \cdot 3H_2O$ which comprises roasting said kainite in the presence of steam at temperature of about 1250° F. to produce by heat reaction an admixture of potassium sulfate, magnesium sulfate and magnesium oxide with evolution of HCl gas, slurrying said admixture with water to form an aqueous solution of the magnesium and potassium sulfates and undissolved magnesium oxide, removing the oxide and subjecting the solution to evaporation to precipitate the potassium sulfate, and separating the same from the liquid residue.

5. The method of producing potassium sulfate from an impure crystalline product of kainite, $$KCl \cdot MgSO_4 \cdot 3H_2O$$

which comprises: finely comminuting said impure product and subjecting to flotation separation in the presence of a fatty amine acetate or chloride for recovering purified kainite, heating said purified kainite in the presence of steam at temperature of about 1250° F. to produce a mixture of $K_2SO_4$, $MgSO_4$ and MgO with evolution of HCl gas, slurrying the reaction mass in water, separating the magnesium oxide from the resulting solution, and subjecting the solution to evaporation until $K_2SO_4$ precipitates in substantial amount and separating the precipitate from the liquid fraction.

6. The method of producing potassium sulfate from an impure crystalline product of kainite, $$KCl \cdot MgSO_4 \cdot 3H_2O$$

which comprises: finely comminuting said impure product and subjecting in an aqueous salt solution which is in equilibrium with said crystalline salts, to a flotation concentration in the presence of a collecting agent comprising a fatty amine acetate or chloride and in the presence of a frothing agent comprising a higher aliphatic alcohol of at least five carbon atoms, for recovering purified kainite, heating the purified kainite in the presence of steam at temperature about 1250° F. to produce a mixture of $K_2SO_4$, $MgSO_4$ and MgO with evolution of HCl gas, leaching the reaction mass with water, to separate the MgO and dissolve the $K_2SO_4$ and $MgSO_4$, and subjecting the solution to evaporation until $K_2SO_4$ precipitates in substantial amount, separating the precipitate from the liquid fraction and subjecting the latter to further evaporation until an additional fraction of $K_2SO_4$ precipitates, and separating the same from the liquid fraction remaining.

7. The method of obtaining potassium sulfate in high yield from an impure crystalline potassium chloride-magnesium sulfate double salt, which comprises: admixing impure crystalline potassium chloride salt with said double salt, finely comminuting the impure salt admixture and subjecting to flotation purification in the presence of a fatty amine acetate or chloride, treating the purified salt admixture in the presence of steam at about 1250° F. to produce a calcinate containing potassium sulfate and magnesium oxide with evolution of HCl gas, water slurrying the calcinate and separating the magnesium oxide from the resulting solution, and concentrating the solution to precipitate potassium sulfate, and separating the precipitate from the liquid portion.

8. The method according to claim 7 wherein said impure crystalline potassium chloride is admixed with said double salt in substantially equimolar proportions of the two.

References Cited

UNITED STATES PATENTS

| | | | |
|---|---|---|---|
| 2,322,789 | 6/1943 | Cole | 209—166 |
| 2,336,854 | 12/1943 | Ferris | 209—166 |
| 2,420,476 | 5/1947 | Greene | 209—166 X |
| 2,689,649 | 9/1954 | Atwood | 209—166 |
| 2,762,509 | 9/1956 | Bachmann | 209—166 |
| 2,766,885 | 10/1956 | Marullo | 209—166 |
| 2,809,880 | 10/1957 | Dancy | 23—201 |
| 3,091,514 | 5/1963 | Leatham | 23—201 |
| 2,937,751 | 5/1960 | Schoeld | 209—166 |
| 3,008,655 | 11/1961 | Adams | 209—166 X |
| 3,203,757 | 8/1965 | Henne | 23—121 |

FOREIGN PATENTS 573,817  3/1958  Italy.

HARRY B. THORNTON, *Primary Examiner.*

ROBERT HALPER, *Assistant Examiner.*

U.S. Cl. X.R.

23—121; 209—166